US011979906B2

(12) United States Patent
Liu et al.

(10) Patent No.: US 11,979,906 B2
(45) Date of Patent: May 7, 2024

(54) RESOURCE RESERVATION FOR NR-U SL

(71) Applicant: QUALCOMM Incorporated, San Diego, CA (US)

(72) Inventors: Chih-Hao Liu, San Diego, CA (US); Yisheng Xue, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/446,283

(22) Filed: Aug. 27, 2021

(65) Prior Publication Data

US 2022/0070925 A1 Mar. 3, 2022

Related U.S. Application Data

(60) Provisional application No. 63/071,696, filed on Aug. 28, 2020.

(51) Int. Cl.
*H04W 72/00* (2023.01)
*H04B 17/318* (2015.01)
*H04W 72/56* (2023.01)
*H04W 74/0808* (2024.01)

(52) U.S. Cl.
CPC ...... *H04W 74/0808* (2013.01); *H04B 17/318* (2015.01); *H04W 72/56* (2023.01)

(58) Field of Classification Search
CPC . H04W 74/0808; H04W 72/10; H04B 17/318
See application file for complete search history.

(56) References Cited

U.S. PATENT DOCUMENTS

| | | | | |
|---|---|---|---|---|
| 2019/0306923 A1* | 10/2019 | Xiong | ............... | H04J 13/0062 |
| 2020/0029340 A1* | 1/2020 | He | .................. | H04W 76/14 |
| 2021/0307070 A1* | 9/2021 | Kim | ................ | H04L 25/0226 |
| 2022/0183036 A1* | 6/2022 | Noh | ..................... | H04L 5/00 |
| 2022/0279581 A1* | 9/2022 | Baek | ................. | G01S 13/765 |
| 2022/0303952 A1* | 9/2022 | Hoang | .............. | H04W 72/10 |

FOREIGN PATENT DOCUMENTS

WO WO-2022106294 A1 * 5/2022

* cited by examiner

*Primary Examiner* — Lakeram Jangbahadur
(74) *Attorney, Agent, or Firm* — Norton Rose Fulbright US LLP/Qualcomm Incorporated

(57) ABSTRACT

In one aspect, a method of wireless communication includes transmitting, by a user equipment (UE), a first transmission in a first Channel Occupancy Time (COT) for a NR-U sidelink channel. The method also includes reserving, by the UE, a resource in a non-shared portion of a second COT and performing, by the UE, a Listen-Before-Talk (LBT) Category (CAT) 4 operation at a start of the second COT, wherein the second COT is associated with the UE. The method includes performing, by the UE, a continuous transmission operation in the second COT based on successfully performing the LBT CAT 4 operation. The method further includes transmitting, by the UE, a second transmission in the reserved resource of the non-shared portion of the second COT based on successfully performing a second LBT CAT 1 or 2 operation. Other aspects and features are also claimed and described.

30 Claims, 12 Drawing Sheets

RESOURCE RESERVATION FOR NR-U SL

CROSS-REFERENCE TO RELATED APPLICATIONS

This application claims the benefit of U.S. Provisional Patent Application No. 63/071,696, entitled, "RESOURCE RESERVATION FOR NR-U SL," filed on Aug. 28, 2020, which is expressly incorporated by reference herein in its entirety.

FIELD

Aspects of the present disclosure relate generally to wireless communication systems, and more particularly, to resource reservation for sidelink channel communications.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes transmitting, by a user equipment (UE), a first transmission in a first Channel Occupancy Time (COT) for a Fifth Generation New Radio-Unlicensed (5G NR-U) sidelink channel; reserving, by the UE, a resource in a non-shared portion of a second COT; performing, by the UE, a Listen-Before-Talk (LBT) Category (CAT) 4 operation at a start of the second COT, wherein the second COT is associated with the UE; performing, by the UE, a continuous transmission operation in the second COT based on successfully performing the LBT CAT 4 operation; and transmitting, by the UE, a second transmission in the reserved resource of the non-shared portion of the second COT based on successfully performing a second LBT CAT 1 or 2 operation.

In an additional aspect of the disclosure, an apparatus configured for wireless communication is disclosed. The apparatus includes means for transmitting, by a user equipment (UE), a first transmission in a first Channel Occupancy Time (COT) for a NR-U sidelink channel; means for reserving, by the UE, a resource in a non-shared portion of a second COT; means for performing, by the UE, a Listen-Before-Talk (LBT) Category (CAT) 4 operation at a start of the second COT; means for performing, by the UE, a continuous transmission operation in the second COT based on successfully performing the LBT CAT 4 operation, wherein the second COT is associated with the UE; and means for transmitting, by the UE, a second transmission in the reserved resource of the non-shared portion of the second COT based on successfully performing a second LBT CAT 1 or 2 operation.

In an additional aspect of the disclosure, a non-transitory computer-readable medium having program code recorded thereon. The program code further includes code to transmit, by a user equipment (UE), a first transmission in a first Channel Occupancy Time (COT) for a NR-U sidelink channel; reserve, by the UE, a resource in a non-shared portion of a second COT; perform, by the UE, a Listen-Before-Talk (LBT) Category (CAT) 4 operation at a start of the second COT; perform, by the UE, a continuous transmission operation in the second COT based on successfully performing the LBT CAT 4 operation, wherein the second COT is associated with the UE; and transmit, by the UE, a second transmission in the reserved resource of the non-shared portion of the second COT based on successfully performing a second LBT CAT 1 or 2 operation.

In an additional aspect of the disclosure, an apparatus configured for wireless communication is disclosed. The apparatus includes at least one processor, and a memory coupled to the processor. The processor is configured to transmit, by a user equipment (UE), a first transmission in a first Channel Occupancy Time (COT) for a NR-U sidelink channel; reserve, by the UE, a resource in a non-shared portion of a second COT; perform, by the UE, a Listen-Before-Talk (LBT) Category (CAT) 4 operation at a start of the second COT; performing, by the UE, a continuous transmission operation in the second COT based on successfully performing the LBT CAT 4 operation, wherein the second COT is associated with the UE; and transmit, by the UE, a second transmission in the reserved resource of the non-shared portion of the second COT based on successfully performing a second LBT CAT 1 or 2 operation.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
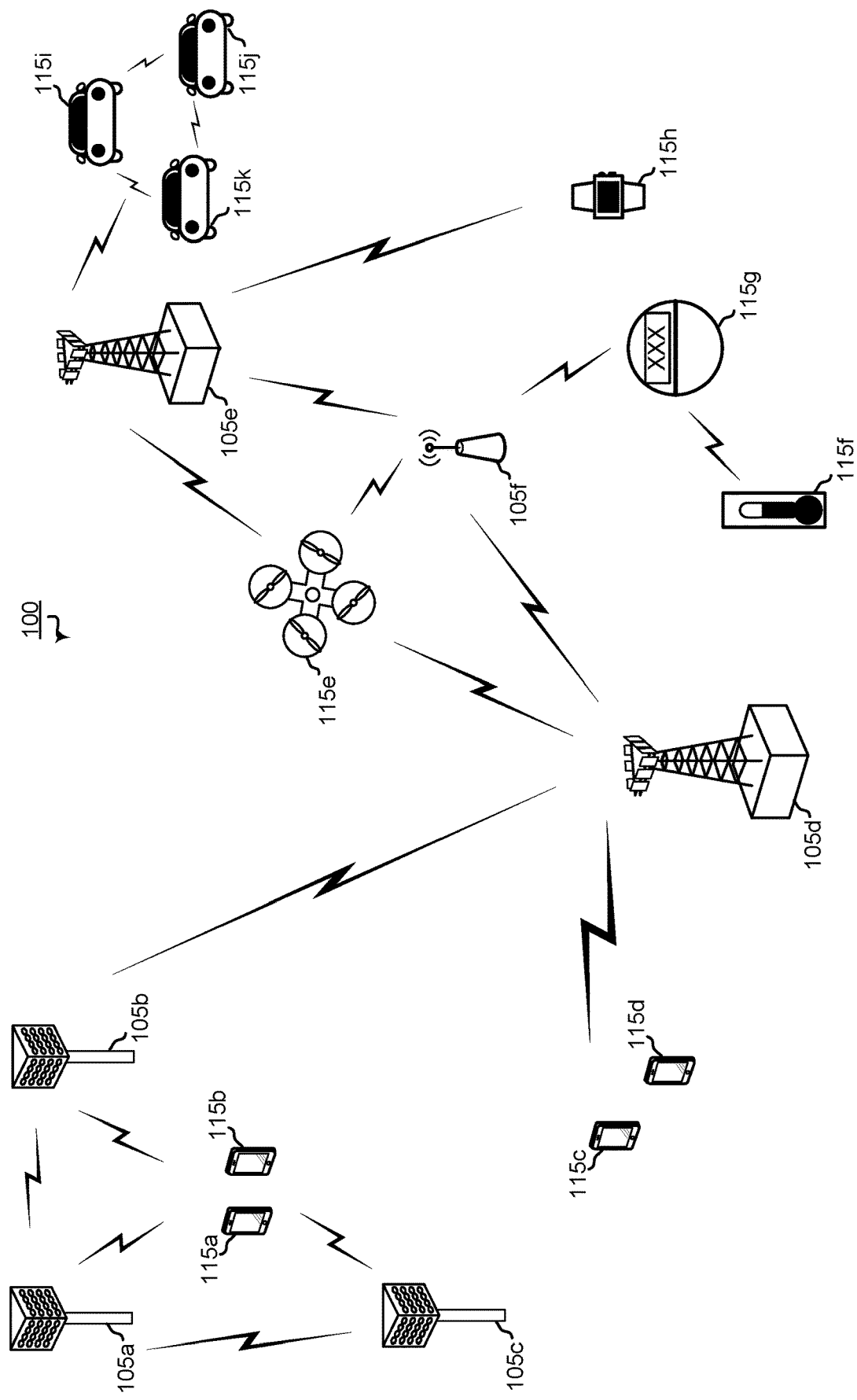
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
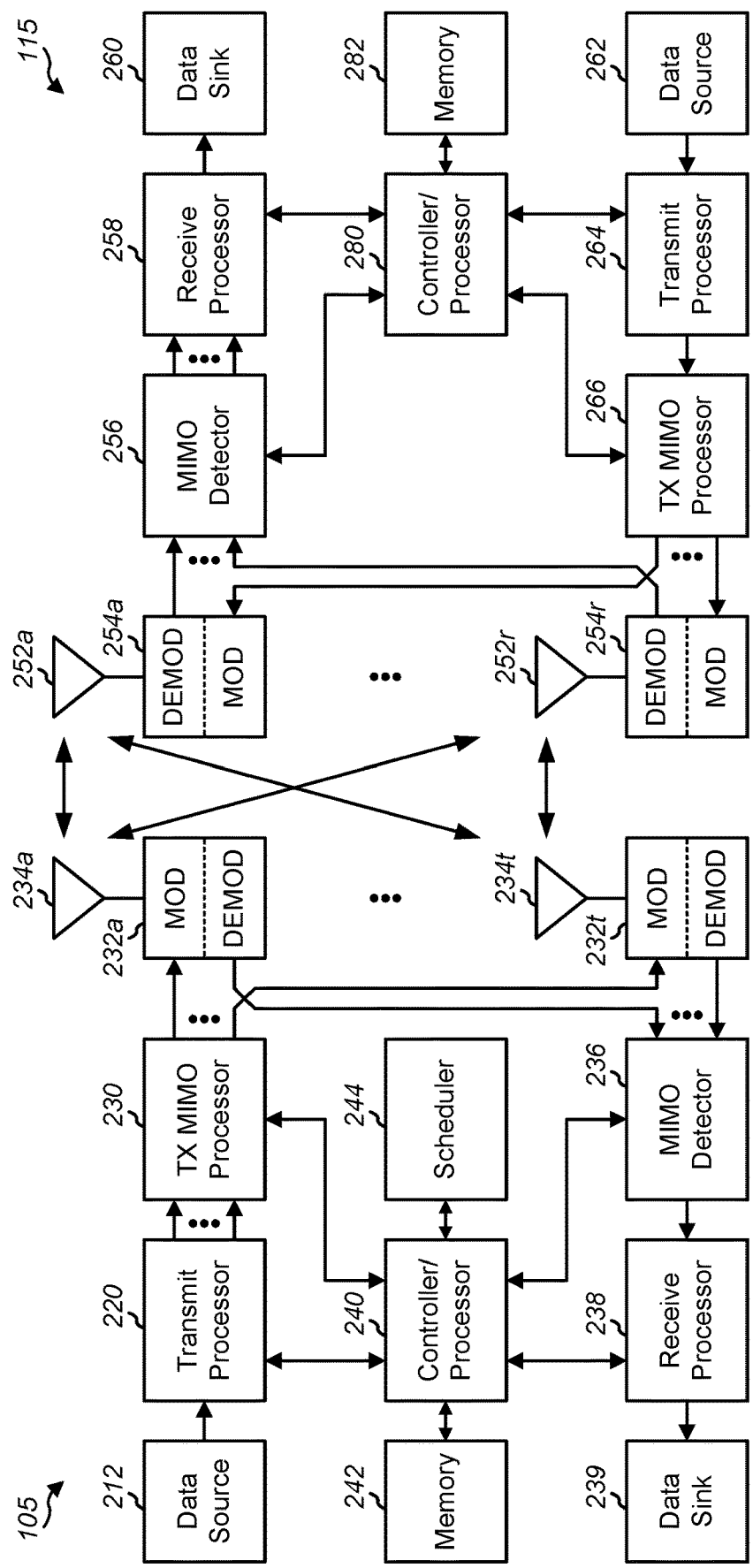
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 11 and 12, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
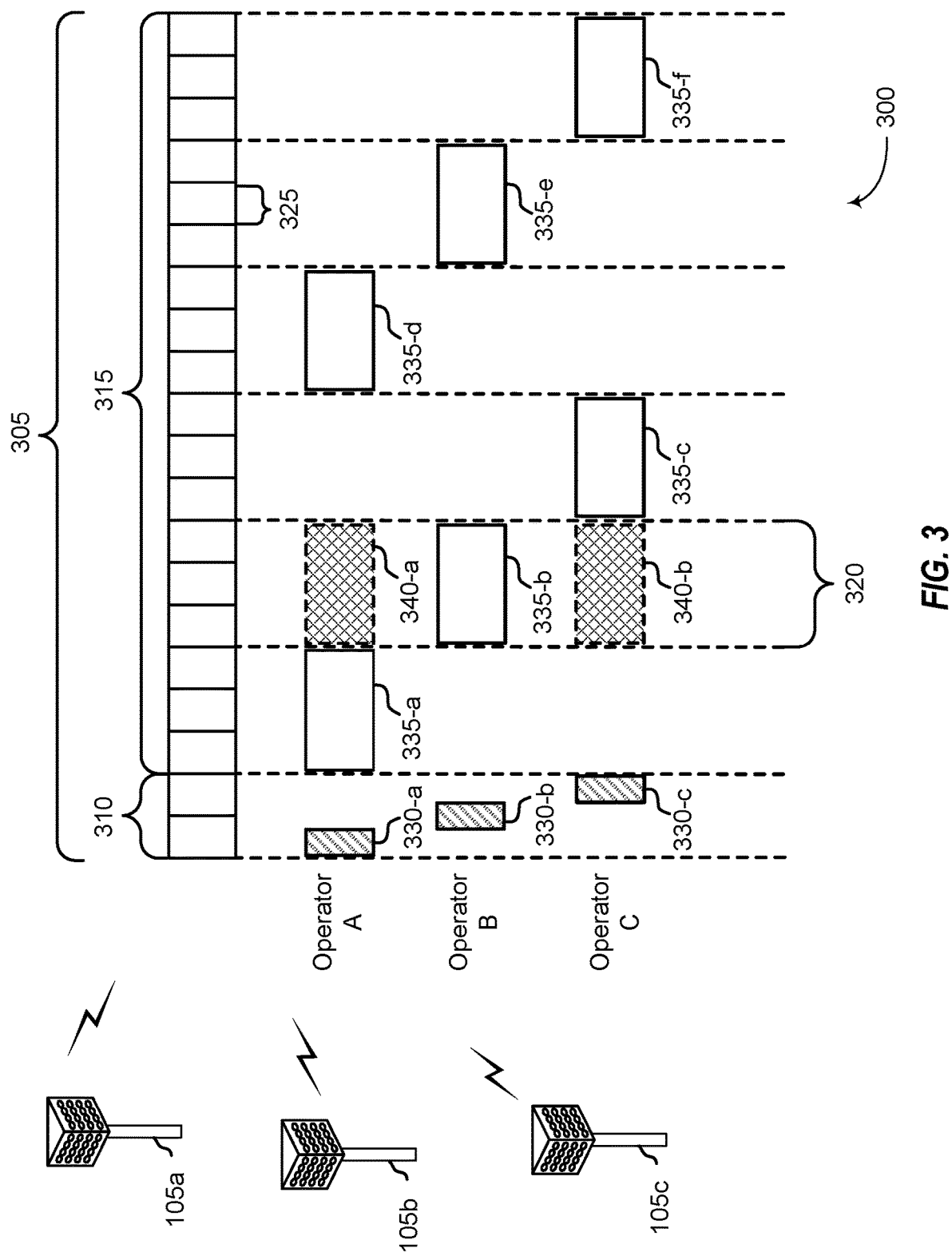
FIG. 3 is a timing diagram illustrating coordinated resource partitioning.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

The aspects described herein are directed to enhanced resource reservation operations for shared spectrum operations, such as in sidelink channel operations. Sidelink channel communications involve device-to-device communications that may occur and/or be scheduled independent of a network (e.g., base station). In such sidelink communications, devices may opportunistically use spectrum which is allocated for device-to-device communication, but such spectrum is not allocated only to a particular device. Devices may perform CCA/LBT operations before transmitting to prevent multiple devices from accessing the spectrum at the same time (e.g., prevent collisions and interference).

In some networks, devices may signal their intent to transmit and attempt to reserve resources in shared spectrum. For example, using a sidelink message, such as SCI-1, a transmitting device can reserve resources for up to three retransmissions in a periodic pattern. A period of this pattern can be indicated in the sidelink message, e.g., SCI-1. For example, a value range can be indicated, such as 1-99, 100, 200, . . . , 1000, etc. A value of 0 may indicate no periodic reservation. A message, such as SCI-1, can be RRC configured to reserve additional slots (e.g., one or two) within thirty-two slots of the first transmission (e.g., first transport block (TB) transmission).

A device (e.g., node) can be triggered to report available resources to or in an upper layer. This information for available resources may be determined based on a history of SCI-1 messages received at a device. For example, a device may monitor SCI-1 messages and take into consideration the resources reserved by other device, and optionally the priority of the monitored SCI-1 messages. For a monitored SCI-1, the device (e.g., node) will reserve the resource for the current transmission and up to 3 retransmissions; the resources in the next instance of the indicated period (if non-zero period indicated). For an occasion that the device (e.g., node) cannot monitor, such as due to half duplex restrictions, the device will assume the worst case (there is an SCI-1 transmitted in the slot but not detected) and block the slots possibly indicated by all periods configured (up to 15 slots).

For sidelink transmission in NR-U, Channel Occupancy Time (COT) sharing is introduced to efficiently and effectively access a medium when competing with other networks and/or protocols, such as WiFi. Nodes may assist other nodes to secure a COT for them and/or share a portion of their own reserved COT with other nodes.

However, such COT sharing may cause some unwanted effects or drawbacks, such as increased LBT operations, increased collisions, more advanced devices hogging the medium, etc. To alleviate one or more of such effects, a UE may utilize the enhanced resource reservation techniques described herein to reduce or eliminate these effects.

As an example, networks may stipulate rules for contending for a medium which increase potential LBT operations when COT sharing. Such rules may include under what conditions devices should perform particular LBT operations. To illustrate, an initiating device may have multiple transmissions without performing an additional CCA in the COT if the gap is less than or equal to 16 µs. Otherwise, if this gap exceeds 16 µs but does not exceed 25 µs, the initiating device may continue transmissions provided that no energy was detected with a level above a threshold (such as perform a CAT 2 LBT operation). If there is a more than 25 µs transmission gap, the UE cannot continue transmission with CAT 1 or 2 LBT operations and a more intensive CAT 3 or 4 LBT operation may be required, even in a UE's own COT.

However, the relative offsets for future RR may be pre-assigned, e.g., dictated by the network and/or RRC configured. Thus, in UE's own future COT, there may be a relatively long (e.g., greater than 25 us) transmission gap before a RR or between RRs, and thus a CAT 4 LBT operation may be needed for retransmission in a particular RR.

In some aspects, a transmitting device may continuously transmit (e.g., transmits data or pad slots) in a non-shared region of a COT with a data transmission or transmission before the particular RR so CAT 1 or 2 LBT operation is possible. In addition, the UE may not perform a CAT 4 LBT operation when continuously transmitting and controlling the medium. Thus, the UE may be able to use a less intensive LBT operation by continuously transmitting.

As another example, in conventional networks, other UEs cannot reserve resources in a non-shared COT region of a COT which is reserved to another UE. However, for resource selection when continuously transmitting (e.g., padding the slots), no subchannels and/or slots in the non-shared COT are excluded due from reservation. In some networks, random resource selection does not guarantee a UE's continuous transmission. For example, random resource selection in Release 16 may not guarantee a UE's continuous transmission until RR1.

In some aspects, a device may utilize a multiple step resource selection/reservation scheme to prioritize a particular UEs RR and/or to reduce continuous transmission length. For example, a UE may prioritize time first and then subchannel to reserve resource before its own RR. Such a scheme may increase a chance of continuous transmission for the UE and/or may reduce a size of continuous transmission for the UE.

In some aspects, a device may adjust or reconfigure a COT to reduce or eliminate continuous transmission. For example, a UE may reduce a size of a shared COT region and increase a size of a non-shared COT region to prioritize its own RR. In some implementations, the non-shared COT region is extended to cover a last RR of the UE.

Additionally, or alternatively, in some aspects a device may reserve a dedicated subchannel in their own COT to maintain continuous transmission. A reserved subchannel may exclude other UEs from resource selection or reservation in the COT or a portion thereof (e.g., the non-shared COT region or the shared COT region). The UE owning the COT may prioritize the reserved subchannel for transmissions which occur before one or more of the RRs. Earlier slots within reserved subchannel are also prioritized. In a particular implementation, the COT owning UE may continuous transmit packets before a RR in the shared COT region. In some implementations, a COT owning UE may also refrain from reserving resources in non-reserved subchannels. In a particular implementation, a portion of the COT may include LBT gaps in the reserved subchannel so that other UEs can clear LBT processes and transmit in other subchannels.

In some aspects, a device may adjust a quality threshold used to determine available resources, referred to as candidate resources, for resource selection. For example, the device may adjust or select a higher or lower reference signal received power (RSRP) threshold to increase or decrease the chances of reserving a resource. To illustrate, adjusting the threshold may make some resources available to the UE or restrict some resources from the UE in an attempt to accommodate less advanced UEs, such as single step or random resource selection UEs.

Additionally or alternatively, in some aspects a device may move one or more RRs. Specifically, a UE may move its own RR or an RR of another UE to accommodate COT sharing. For example, a UE may move its own RR to reduce or eliminate continuous transmission (e.g., padding). To illustrate, a UE may move one or more RRs to an earlier slot. As another example, a UE may move a RR of another UE to prevent a possible RR collision.

In some implementations, moving a RR of another UE may involve sending a new sidelink transmission. For example, the UE may use a new SCI-2 message. To illustrate, the SCI-2 message may have a different format than conventional sidelink messages or SCI-2 messages. In a particular implementation, the SCI-2 message may include additional information or fields to relocate a RR of another UE.

Figure 4:
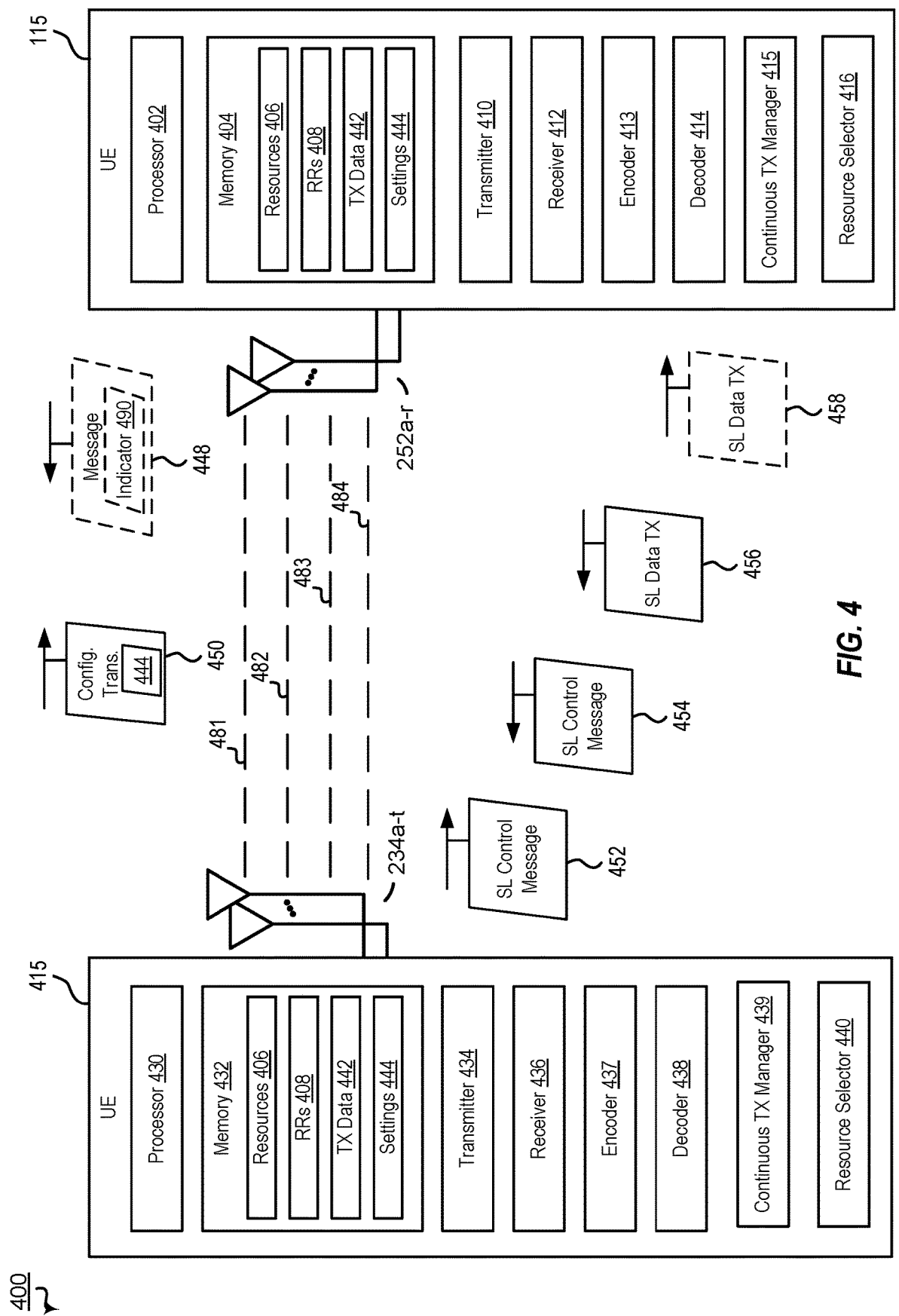
FIG. 4 is a block diagram illustrating an example of a wireless communications system (with a UE and base station) with enhanced resource reservation operations.

FIG. 4 illustrates an example of a wireless communications system 400 that supports enhanced resource reservation for sidelink communications in accordance with aspects of the present disclosure. In some examples, wireless communications system 400 may implement aspects of wireless communication system 100. For example, wireless communications system 400 may include UEs 115 and 415. Enhanced resource reservation for sidelink communications operations may reduce network overhead and latency and increase throughput. Thus, network and device performance can be increased.

UE 115 and 415 may be configured to communicate via frequency bands, such as FR1 having a frequency of 410 to 7125 MHz, FR2 having a frequency of 24250 to 52600 MHz for mm-Wave, and/or one or more other frequency bands. It is noted that SCS may be equal to 15, 30, 60, or 120 kHz for some data channels. UE 115 and 415 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, Hybrid automatic repeat request (hybrid ARQ or HARQ) process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and 415. For example, the control information may be communicated suing MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, continuous transmission manager 415, resource selector 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store resources data 406, reserved resources data 408, transmission data 442, settings data 444, or a combination thereof, as further described herein.

The resources data 406 includes or corresponds to data associated with or corresponding to available resources. For example, the resources data 406 may indicate candidate resources (e.g., available resources) of a candidate resource set. The resources data 406 may also include thresholds or data used to evaluate the resources selection conditions, such as conditions for candidate resources. Additionally, the resources data 406 may also include thresholds or data used to evaluate resources selection conditions for certain COT conditions. The resources data 406 may further include COT data. For example, the COT data may include COT configurations, COT adjustment conditions, COT allocations, etc.

The RR data 408 includes or corresponds to data indicating or corresponding to RR for data transmissions. For example, the RR data 408 may include RRs for particular transmission (e.g., particular TB). The RR data 408 may also include parameters or settings for determining RRs and/or selecting or prioritizing resources. For example, the RR data 408 may include network configured or pre-configured settings for RR location and period. As another example, the RR data may include data for a two-step selection process.

The transmission data 442 includes or corresponds to data that is associated with data transmissions for sidelink channels. The transmission data 442 may include data transmissions and retransmissions for sidelink channels.

The settings data 444 includes or corresponds to data associated with enhanced resource reservation operations. The settings data 444 may include one or more types of resource reservation operation modes and/or thresholds or conditions for switching between resource reservation modes and/or configurations. For example, the settings data 444 may have data indicating different thresholds for different resource reservation modes, such as UE single step resource selection and two-step resource selection.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Continuous transmission manager 415 may be configured to determine and perform continuous transmission operations. For example, continuous transmission manager 415 is configured to determine when to use continuous transmission. As another example, continuous transmission manager 415 is configured to generate packets for continuous transmission. In some implementations, the continuous transmission manager 415 ix configured to generate padding data to pad one or more slots of the continuous transmission Resource selector 416 may be configured to determine and perform resource selection operations. For example, resource selector 416 may be configured to determine available resources, prioritize available resources, and reserve resources.

UE 415 includes processor 430, memory 432, transmitter 434, receiver 436, encoder 437, decoder 438, continuous transmission manager 439, resource selector 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store resource data 406, RR data 408, transmission data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UE 415 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of UE 415 described with reference to FIG. 2.

Encoder 437, and decoder 438 may include the same functionality as described with reference to encoder 413 and decoder 414, respectively. Continuous transmission manager 439 may include similar functionality as described with reference to continuous transmission manager 415. Resource selector 440 may include similar functionality as described with reference to resource selector 416.

During operation of wireless communications system 400, UE 415 may determine that UE 115 has enhanced resource reservation capability. For example, UE 115 may transmit a message 448 that includes an enhanced resource reservation indicator 490 (e.g., two-step resource selection indicator). Indicator 490 may indicate enhanced resource reservation operation capability or a particular type or mode of resource reservation operation. In some implementations, UE 415 sends control information to indicate to UE 115 that enhanced resource reservation operation and/or a particular type of enhanced resource reservation operation is to be used. For example, in some implementations, message 448 (or another message, such as configuration transmission 450) is transmitted by the UE 415 or a network entity. The configuration transmission 450 may include or indicate to use enhanced resource reservation operations or to adjust or implement a setting of a particular type of enhanced resource reservation operation.

During operation, devices of wireless communications system 400, perform enhanced resource reservation operations. For example, the UEs 115 and 415 exchange transmissions via a sidelink channel. In the example of FIG. 4, the UE 415 transmits a sidelink channel control message 452 to the UE 115. The sidelink channel control message 452 may include or indicate a particular resource selected by the UE 415 for reservation. To illustrate, the UE 415 may send a SCI message indicating the resource.

The UE 115 may receive the sidelink channel control message 452 and may determine the particular resource reserved by the UE 415. In some implementations, the UE 115 may determine to relocate the selected resource release based on the resource overlapping or colliding with a RR of the UE 115. The RR of the UE 115 may correspond to a retransmission of a prior transmission in some implementations.

In such implementations where the UE 115 determines to relocate the selected resource, the UE 115 may send a sidelink channel control message 454 to relocate the selected resource. Additionally, or alternatively, the UE 115 transmits the sidelink channel control message 454 to indicate one or more RRs of the UE 115.

The UEs 115 and 415 may then transmit data based on the sidelink channel control message 452 and/or 454. For example, the UE 115 may transmit a sidelink channel data transmission 456, and the UE 415 may optionally transmit a sidelink channel data transmission 458. The UE 115 may continuously transmit and/or pad one or more slots prior to the sidelink channel data transmission 456 to prevent another UE (e.g., 415) from transmitting prior to the UE 115. Thus, the UE 115 may perform a reduced or no LBT operation (e.g., CAT 1 or 2 LBT operation) prior to transmitting the sidelink channel data transmission 456.

Accordingly, the UEs 115 and 415 may be able to more efficiently perform resource reservation operations. Thus, FIG. 4 describes enhanced resource reservation operations. Using enhanced resource reservation operations may enable improvements when operating in shared spectrum. Performing enhanced resource reservation enables reduced bandwidth/spectrum waste when performing contention operations and thus, enhanced UE and network performance by increasing throughput and reducing latency.

Figure 5:
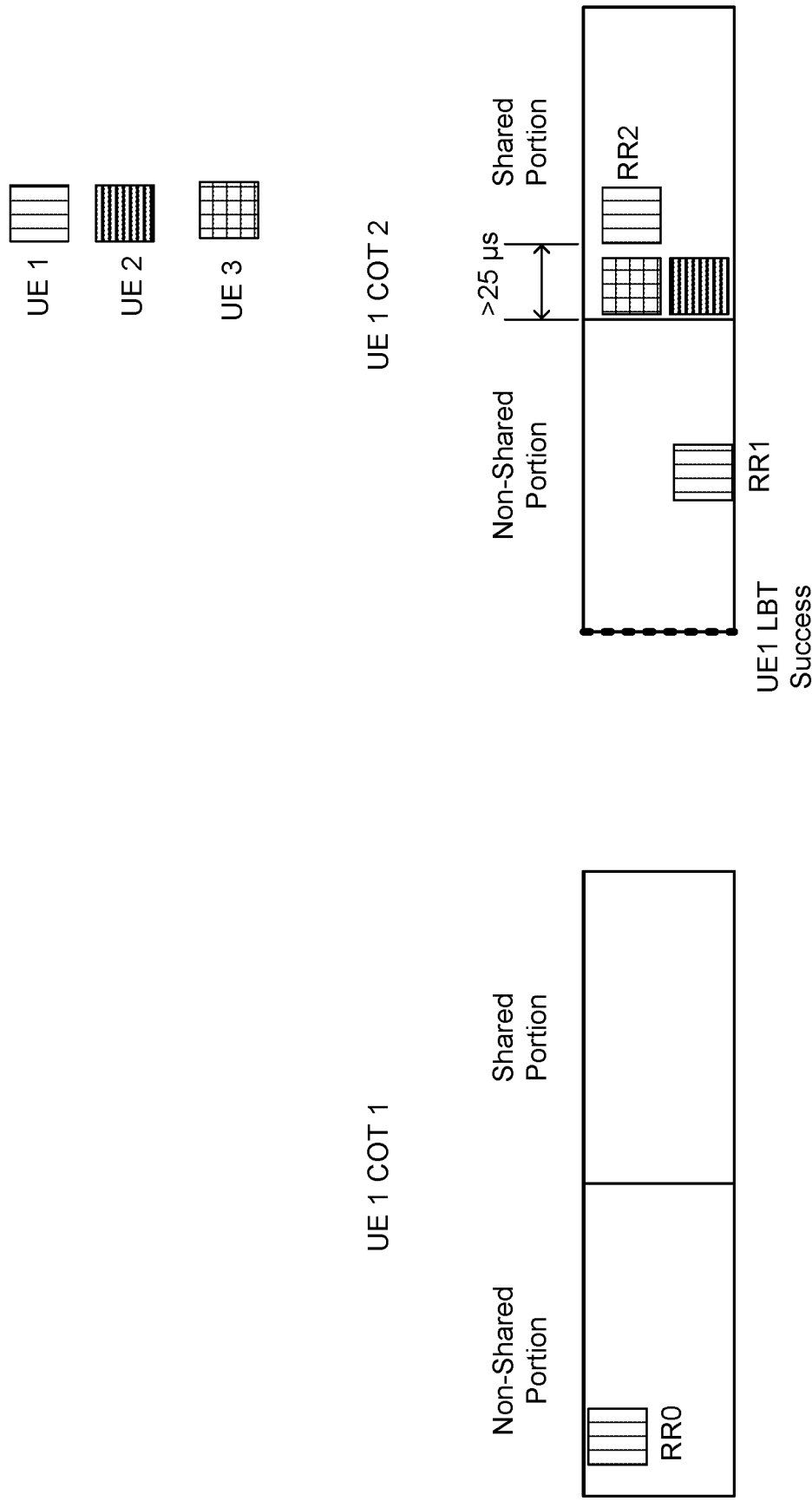
FIG. 5 is a diagram illustrating an example of continuous transmission operations according to some embodiments of the present disclosure.

FIG. 5 is a diagram illustrating an example of continuous transmission operations. In FIG. 5, a plurality of COTs are illustrated. Specifically, two COTs are depicted with both COTs reserved or allocated to a first UE. Each of the reserved COTs may include a non-shared region and a shared region. In other implementations, one or more other COTs may occur between the two COTs, that is between COTs reserved to the first UE.

FIG. 5 depicts resources reserved for multiple UEs, first, second, and third UEs. A first UE (UE 1) may have or be associated with a plurality of reserved resources (RRs) for a later COT which correspond to a first transmission in a first COT. In the example of FIG. 5, the first UE is associated with two future RRs (RR1 and RR2). A first RR (RR1) is located in a non-shared portion of the COT, and a second RR (RR2) is located in a shared portion of the COT. A second UE (UE 2) has a transmission (e.g., RR) in the shared portion of the COT and a third UE (UE 3) has a RR (UE 3 RR2) in the shared portion of the COT.

The RRs for the first UE may be pre-assigned based on network and/or device settings. Also, such RRs may include RRs (e.g., UE 1 RR1 and RR2) which are located more than 25 μs into the COT. Thus, as other UE's may schedule and transmit in the portion prior to the RR, the first UE may need to perform a LBT operation, such as a CAT 4 LBT operation, prior to transmitting in the RR.

To eliminate such an occurrence, the first UE may engage in continuous transmission to reduce or eliminate LBT operations. For example, the first UE may transmit other data or continuously pad the slots in the non-shared COT region with UE's data transmission before the first RR so a CAT 1 or 2 LBT operation is possible. To illustrate, a CAT 1 or 2 LBT operation is performed right before the first RR or at a start of the first RR. In some implementations, a prior and/or full LBT operation may occur prior to the reduced LBT operation for the first RR. For example, the UE may perform a CAT 3 or 4 operation at a start of the non-shared portion as illustrated in FIG. 5 to secure the medium for the continuous transmission and the first RR transmission.

Additionally, or alternatively, the first UE continuously transmits between the first RR and the second RR. For example, the first UE may continuously pad the slots between the first RR and the second RR. However, such long padding may not be possible (e.g., UE buffer size limitation) or a transmission gap is unavoidable due to previous reserved resources. In addition, such long padding ties up the medium, which may not be compatible with other networks and/or protocols (e.g., WiFi), and reduces throughput.

In other implementations, the first UE may adjust the shared COT region so that non-shared COT region covers its own next and/or last RR. For example, the first UE may protects its own RR by downsizing the shared COT region to prioritize its own RR without additional padding (e.g., padding between RR1 and RR2). Additional alternatives to extra padding are described with reference to FIG. 7.

Figure 6:
FIG. 6 is a diagram illustrating an example of resource selection according to some embodiments of the present disclosure.
Figure 6:

FIG. 6 is a diagram illustrating an example of two-step resource selection. In FIG. 6, a resource selection window (RSW) is illustrated. The RSW illustrates resources of a COT for a UE where rows correspond to time slots and columns correspond to channels. To illustrate, the RSW illustrates six time slots for four different subchannels. As illustrated in FIG. 6, the UE includes a RR (e.g., RR1) in a sixth slot and a first channel.

In FIG. 6, white box resources are candidate resources which belong to a candidate resource set, and grey box resources are unavailable resources or non-candidate resources. As previously described, resources are evaluated based on a quality condition or criterion, such as RSRP; candidate resources satisfy the quality condition or criterion. For example, the candidate resources are resources which have a RSRP below a RSRP threshold.

The candidate resource set may be reported to higher layers and/or other devices. In conventional, single step (e.g., random resource selection), candidate resources are selected randomly from the candidate resource set and are reserved or selected for reservation.

In the example of FIG. 6, a two-step resource selection process is illustrated which is based on time and subchannel. For example, the two-step resource selection may prioritize candidate resources from the candidate resource set with earlier times first and then prioritize the candidate resources based on subchannels second. To illustrate, a UE may select candidate resources with times before its own RR and then based on a subchannel priority (e.g., lower subchannels, higher subchannels, or subchannel priority index, etc.).

In such two-step resource selection processes, a UE may start with a first slot within the candidate resource set, and then a second slot, and then a third slot, and so on. After filling up the slots in time order, the UE may then continue assigning the slots for the next available subchannel.

To illustrate, with respect to the RSW of FIG. 6, the UE assigns a first slot (e.g., leftmost slot) in a first subchannel (e.g., bottommost channel) as a first resource (e.g., resource 0). The UE may then assign a second resource (e.g., 1) in a second slot. As the only available resource of the second slot which is available is in a fourth or lowest priority subchannel, the UE assigns the second slot in the fourth subchannel as the second resource (e.g., 1). The UE then continues assigning resources in the first subchannel for third through fifth slots, as such slots are available. The UE then skips the sixth time slot for assigning resource priorities because the RR for the UE is scheduled for the sixth slot. The UE then reverts back to the first slot for the sixth resource (e.g., 5) which is in the third subchannel because the second subchannel is not available for the first slot. Such two-step schemes and other schemes which prioritize earlier times increase earlier resource reservation and reduce possible continuous transmission durations.

Figure 7:
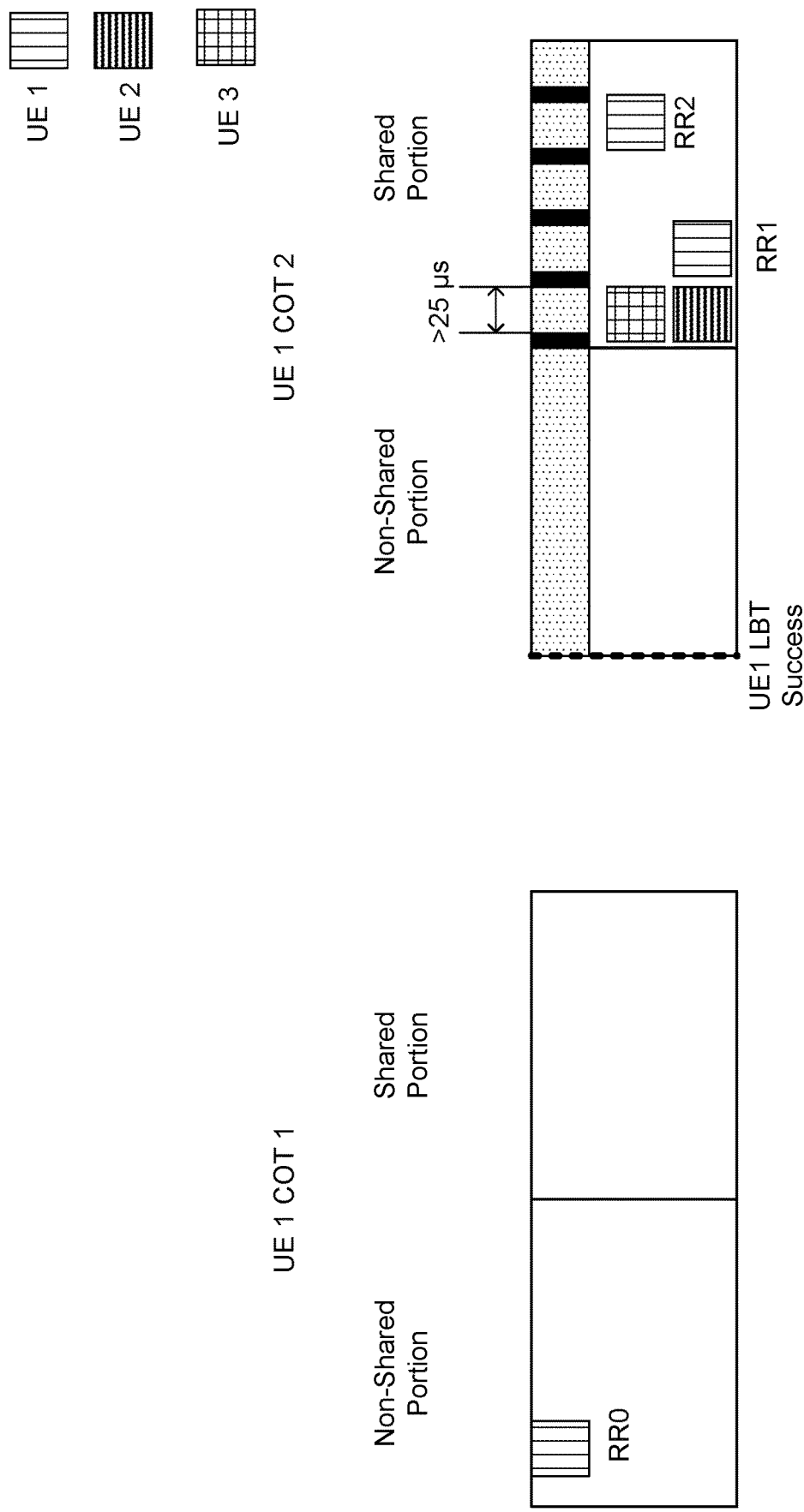
FIG. 7 is a diagram illustrating another example of continuous transmission operations according to some embodiments of the present disclosure.

FIG. 7 is a diagram illustrating another example of continuous transmission operations. In FIG. 7, a plurality of COTs are illustrated. Specifically, two COTs are depicted with both COTs reserved or allocated to a first UE. Each of the reserved COTs may include a non-shared region and a shared region. In other implementations, one or more other COTs may occur between the two COTs, that is between COTs reserved to the first UE.

FIG. 7 depicts resources reserved for multiple UEs, first, second, and third UEs. A first UE (UE 1) may have or be associated with a plurality of reserved resources (RRs) for a later COT which corresponds to a first transmission in a first COT. In the example of FIG. 7, the first UE is associated with two future RRs (RR1 and RR2). Both RRs (RR1 and RR2) are located in a shared portion of the second COT. A second UE (UE 2) has a transmission (e.g., RR) in the shared portion of the second COT and a third UE (UE 3) has a RR (UE 3 RR2) in the shared portion of the second COT.

The RRs for the first UE may be pre-assigned based on network and/or device settings. Also, such RRs may include RRs (e.g., UE 1 RR1 and RR2) which are located more than 25 μs into the second COT or a portion of the second COT. Thus, as other UE's may schedule and transmit in the portion prior to the RRs, the first UE may need to perform a LBT operation, such as a CAT 4 LBT operation.

To eliminate such an occurrence, the first UE may engage in continuous transmission to reduce or eliminate LBT operations, as described with reference to FIG. 5. Alternatively, a dedicated reserved subchannel for a COT owning UE (e.g., first UE) may be used to maintain continuous transmission as illustrated in FIG. 7. In the example of FIG. 7, a fourth subchannel (e.g., topmost row) is reserved to the first UE which reserved or was allocated the second COT. A reserved subchannel is excluded from resource selection or reservation by other UE's in the non-shared and shared COT regions. Thus, only the first UE may transmit in the reserved subchannel.

A UE owning the COT will prioritize the reserved subchannel before other subchannels. The UE may also prioritize slots in the reserved subchannel before the RRs. In addition, earlier slots within reserved subchannel may also be prioritized. The COT owning UE may continuously transmit packets before the RR or RRs in the reserved subchannel in the shared COT region. The UE may also continuously transmit packets in the reserved subchannel in the non-shared COT region.

In some implementations, the COT owning UE may also refrain from reserving resources (e.g., RRs) in reserved subchannel. Otherwise, if there are more than one RR in the shared COT region, UE may transmit a new TB on the first RR when there is no retransmission in order to maintain continuous transmission until a second (e.g., next) RR.

Additionally, or alternatively, the reserved subchannel may include LBT gaps. For example, one or more slots of the reserved channel may include a LBT gap. To illustrate, in the example of FIG. 7 each slot in the reserved subchannel of the non-shared COT region includes a LBT gap. The LBT gap enables other UEs to clear the LBT gap (e.g., successfully perform a LBT operation) and transmit in other subchannels.

In some implementations, other subchannels may include one or more LBT gaps. Additionally or alternately, although the LBT gaps are only present in the shared portion of the second COT (shared COT region), the non-shared COT region may include one or more LBT gaps in other implementations.

Figure 8:
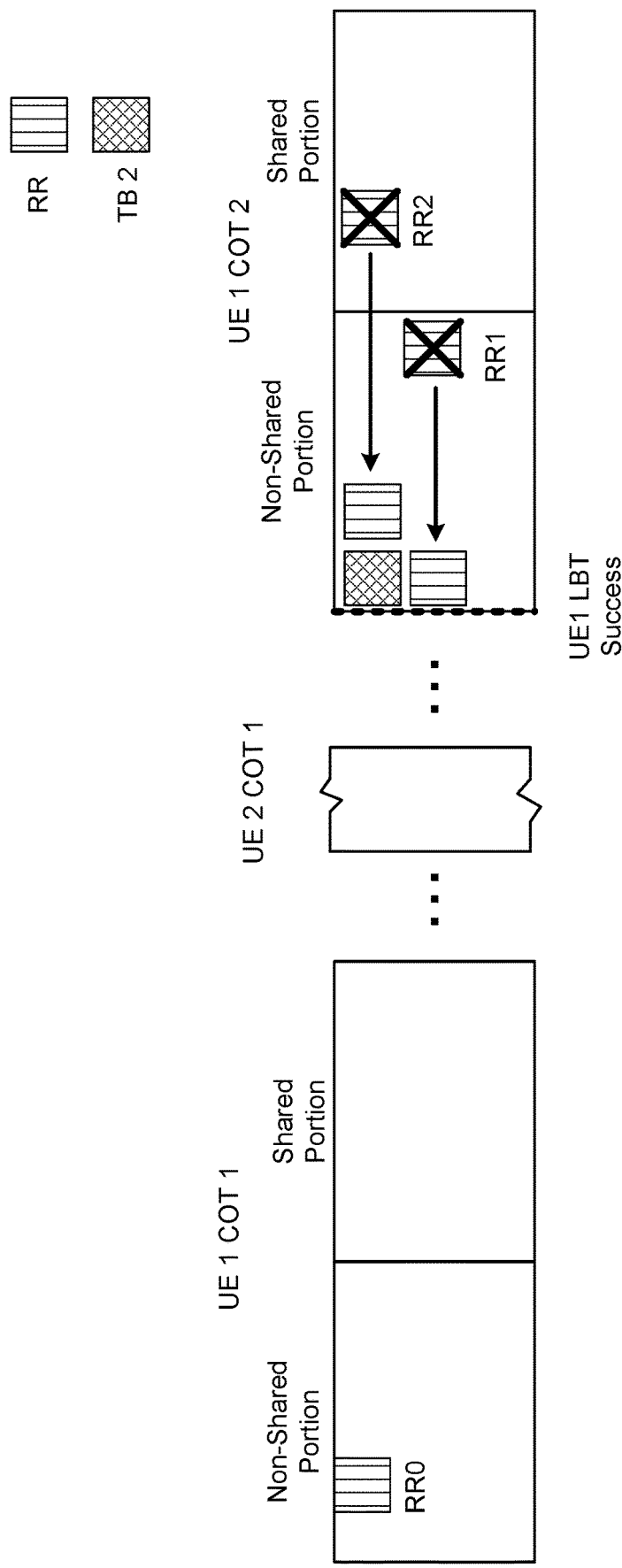
FIG. 8 is a diagram illustrating an example of resource relocation according to some embodiments of the present disclosure.

FIG. 8 is a diagram illustrating an example of resource relocation. In FIG. 8, a plurality of COTs are illustrated. Specifically, three COTs are depicted with first and third COTs reserved or allocated to a first UE (UE 1) and a second a COT reserved or allocated to a second UE (UE 2). Each of the reserved COTs may include a non-shared region and a shared region. In other implementations, one or more other COTs may occur between the first and third COTs, that is between COTs reserved to the first UE.

FIG. 8 depicts "special handling" for reserved resources for a UE within their own COT. That is, a UE may adjust the COT itself or adjust where the reserved resources occur within the COT.

As an example of adjusting the COT itself, the first UE may enlarge the non-shared portion of the COT, reduce the shared portion of the COT, or eliminate the shared portion of the COT. Accordingly, the UE may prevent or reduce other devices from being able to reserve resources in the first UE's COT.

As an example of resource relocation for the UE itself, the UE may move (e.g., relocate) one or more of its own reserved resources. For example, the first UE may move one or more resources earlier in the COT, such as from the shared region to the non-shared region of the COT. To illustrate, a first and second reserved resource for the UE may be moved from the shared region to the non-shared region of the COT.

In the example of FIG. 8, the first UE also may have other data to send, such a data corresponding to a new, second TB. In some implementations, the first UE may transmit the new second TB in a first slot of the non-shared portion of the COT.

In some such implementations, the UE may move a RR to the same slot of the new TB. The RR may be frequency division multiplexed on a different subchannel or to the slot immediately after the last new TB or TBs. In such implementations, no additional LBT is required since the retransmission is a continuous transmission within the UE's non-shared portion of COT.

If the original RR is in the shared COT region, as indicated by SI-COT, the RR is treated as cancelled by the other UEs. Other UEs monitoring the SI-COT could figure out the starting position of the shared COT region and the source UE's RR in the shared COT region is treated cancelled. In some implementations, the other UE can reserve on the cancelled RR if the timeline permits.

The new locations of RRs are within the non-shared COT region and are up to the transmitting node scheduling decision. As other nodes do not put RRs in the non-shared COT region for two-step (e.g. 2-stage) resource reservation, the source UE can schedule retransmission anywhere within the non-shared COT region.

Figure 9:
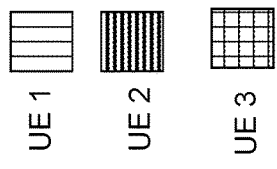
FIG. 9 is a diagram illustrating an example of in and out of COT priority for resource selection according to some embodiments of the present disclosure.
Figure 9:
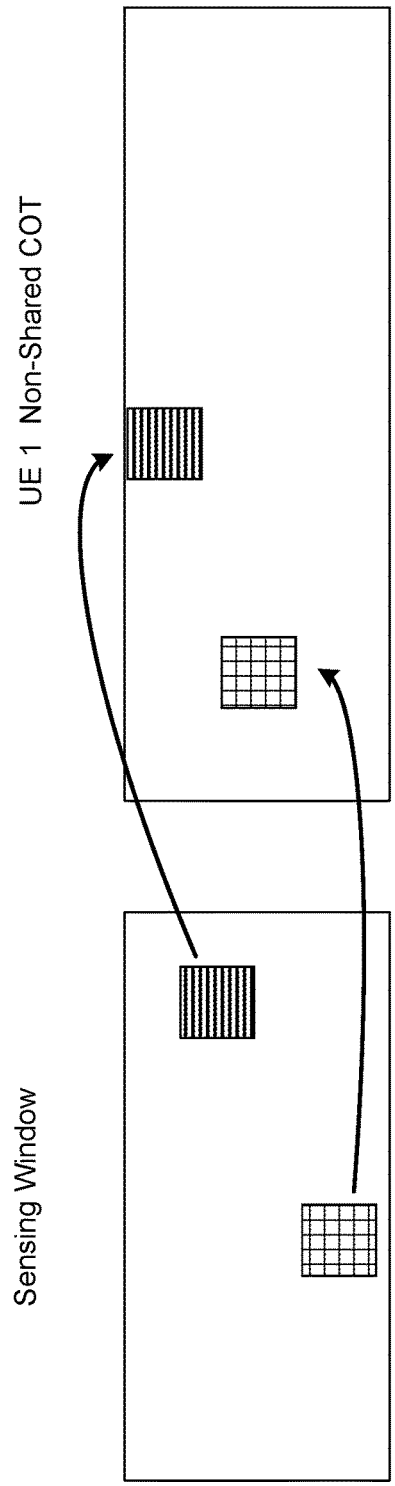

FIG. 9 is a diagram illustrating an example of in and out of COT priority for resource selection. In FIG. 9, a sensing window and a non-shared COT region are illustrated.

Referring back to the RSW of FIG. 6, the quality condition or criterion for determining available resources may be adjusted based on whether the resource falls within a COT of the UE or outside of COT of the UE. For example, when a UE is performing resource selection for resources which falls out-of-COT (e.g., outside of its own COT or inside another UE's non-shared COT region), the quality condition or criterion could be set or adjusted (e.g., higher) so that the other UE which checks out the COT (e.g., COT owning UE) has higher probability utilizing the resource. To illustrate, the RSRP threshold could be higher so that the other UE which checks out the COT has a higher probability of utilizing the resource. However, in the shared COT region, other UEs may recognize the shared COT region has higher priority over some UEs which do not recognize the shared COT region. Thus, legacy reserved resources reserved by legacy devices with an absolute offset may have lower priority.

In a particular implementation, legacy UE's, one-step resource selection UE's, random resource selection UE's, etc., may utilize higher thresholds to have an increased chance of the RSRP being below the threshold and that such resource will be available for resource selection. To illustrate, if the RSRP threshold is raised, a particular (e.g., legacy) UE may be able to reserve one or more of the grey box resources, non-candidate resources, of FIG. 6 which are unavailable to another UE (e.g., two-step resource selection UE).

Additionally, or alternatively, other types of UE's (e.g., two-step resource selection UE's) may utilize adjusted quality conditions or criteria. For example, a RSRP threshold could be lower for a particular UE and thus resources can be excluded from the resource selection with higher probability. The adjusted quality condition or criterion may apply to all resource selection or only to resource selection that falls within the UE's own COT. In some such implementations, the adjusted quality condition or criterion may apply to the shared region, the non-shared region, or both.

An example illustration of such within COT and out-of-COT priority is illustrated in FIG. 9. RSRP values may be measured during a sensing window as illustrated in FIG. 8. In the example of FIG. 9, a second UE and a third UE (UE 3) performing sensing operations. Each UE then determines (e.g., estimates, approximates, extrapolates) projected RSRPs for future resources and selection/reservation thereof.

Based on the sensing operations and the determined projected future RSRPs, the second UE attempts to reserve a resource in the first UE's non-shared COT region, and the third UE also attempts to reserve a resource in the first UE's non-shared COT region. Such attempts may result in a success or result in a success more often as the second and third UEs may be able to select from resources which are not available to the first UE due to the devices using different RSRP thresholds for determining available resources.

Figure 10:
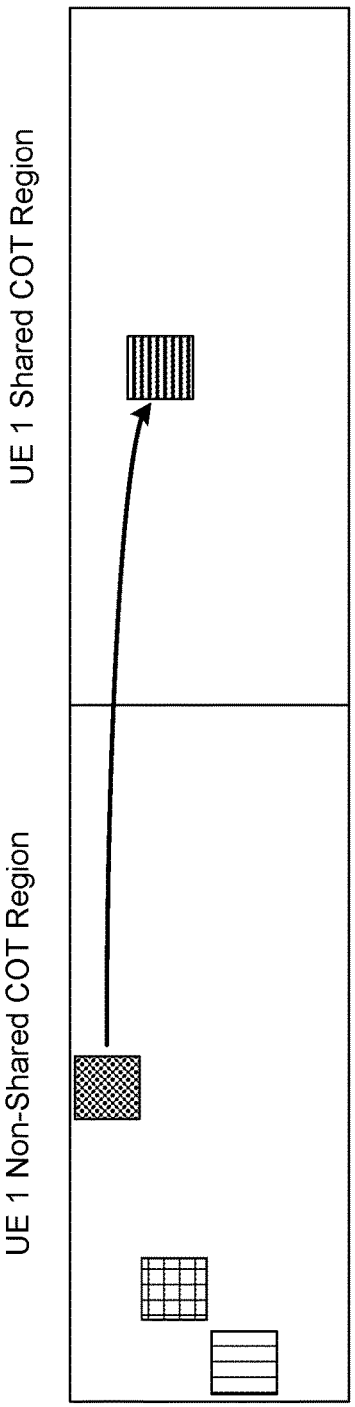
FIG. 10 is a diagram illustrating another example of resource relocation according to some embodiments of the present disclosure.

FIG. 10 is a diagram illustrating another example of resource relocation. In FIG. 10, a COT for a particular UE (a first UE, UE 1) is illustrated. The reserved COT includes a non-shared region and a shared region.

In some instances, a particular device may not succeed in reserving a resource out-of-COT, that is in the example of FIG. 10, reserving a resource in the non-shared COT region. For example, the device may not succeed even if adjusted or alternative RSRP thresholds were used to determine available resources (e.g., candidate resources). In such cases, a UE (e.g., two-step resource selection UE) may be able to relocate a resource for another UE (e.g., a legacy UE). To illustrate, the first UE may be able to relocate a RR for another UE from the non-shared COT region to the shared COT region.

As illustrated in the example of FIG. 10, the second UE's RR is scheduled for the same resource, slot and subchannel, as a RR for the first UE. The first UE may determine such a collision will occur and relocate the RR for the second UE. For example, the first UE may determine that itself and another UE (second UE) have both attempted to reserve the same resource based on receiving a message (e.g., SCI-1) from the other UE. The first UE may select another resource for the RR of the second UE, randomly, based on a two-step process, or another process. The first UE may then send a message or messages (e.g., SCI-1 and/or SCI-2) to the other UE to inform the other UE that the resource has been moved (e.g., relocated). As illustrated in the example of FIG. 10, the message(s) may be sent prior to the RR of the second UE, such as the first time slot of the non-shared COT region.

Alternatively, the first UE may determine to not move the RR for the third UE based on the RR for the third UE not colliding with a RR for the first UE and/or based on the RR for the third UE occurring far enough before the RR for the first UE.

In some implementations, some a RR SCI-1 (e.g., legacy RR SCI-1) indicates a location of one or more RRs in terms of absolute slot offset and subchannel. For example, the RR SCI-1 may include a field for absolute slot offset and a field for subchannel.

In some implementations, when the UE blocks another UE's legacy RR in its own non-shared COT region, the UE may reserve a RR in the shared COT region on other UE's behalf based on relocation signaling which may be via RR SCI-1 in combination with a new SCI-2 format.

For example, the RR SCI-1 may indicate the slot offset and subchannel for the relocated legacy RR. The devices may then move the legacy RR into the shared COT region. By decoding the relocation RR SCI-1 in the non-shared COT region, additional other UEs that intend to transmit in shared COT region may respect the relocated legacy RR.

A single relocation SCI-1 may be configured to relocate one or more legacy RRs associated with a single HARQ ID within the non-shared COT region. Multiple SCI-1's may be configured to relocate multiple set of RRs associated with multiple HARQ ID.

In some implementations, a new SCI-2 format may be used to indicate details of the relocation to transmitting and receiving nodes. The new SCI-2 format may include a source ID filed which indicates a transmitting UE ID for the reservation, a destination ID field which indicates the receiving UE ID for the reservation, a HARQ ID field which indicates that the RR (or RRs) associated with specific HARQ ID has been relocated.

In some implementations, a transmitting and receiving pair may have multiple sets of legacy RRs associated with different HARQ IDs in the same non-shared COT region. The HARQ ID (as indicated by the HARQ ID field) may be used to indicate which set of legacy RRs is to be relocated.

Additionally, or alternatively, one or more operations of FIGS. 4-10 may be added, removed, substituted in other implementations. For example, in some implementations, the example steps of FIGS. 5 and 7 may be used together. To illustrate, the continuous transmission of FIG. 5 may be used with the reserved subchannel of FIG. 7. As another example, some of the steps of two-step resource selection of FIG. 6 may be used with any of FIGS. 4, 5, and 7-10.

Figures 11, 12:
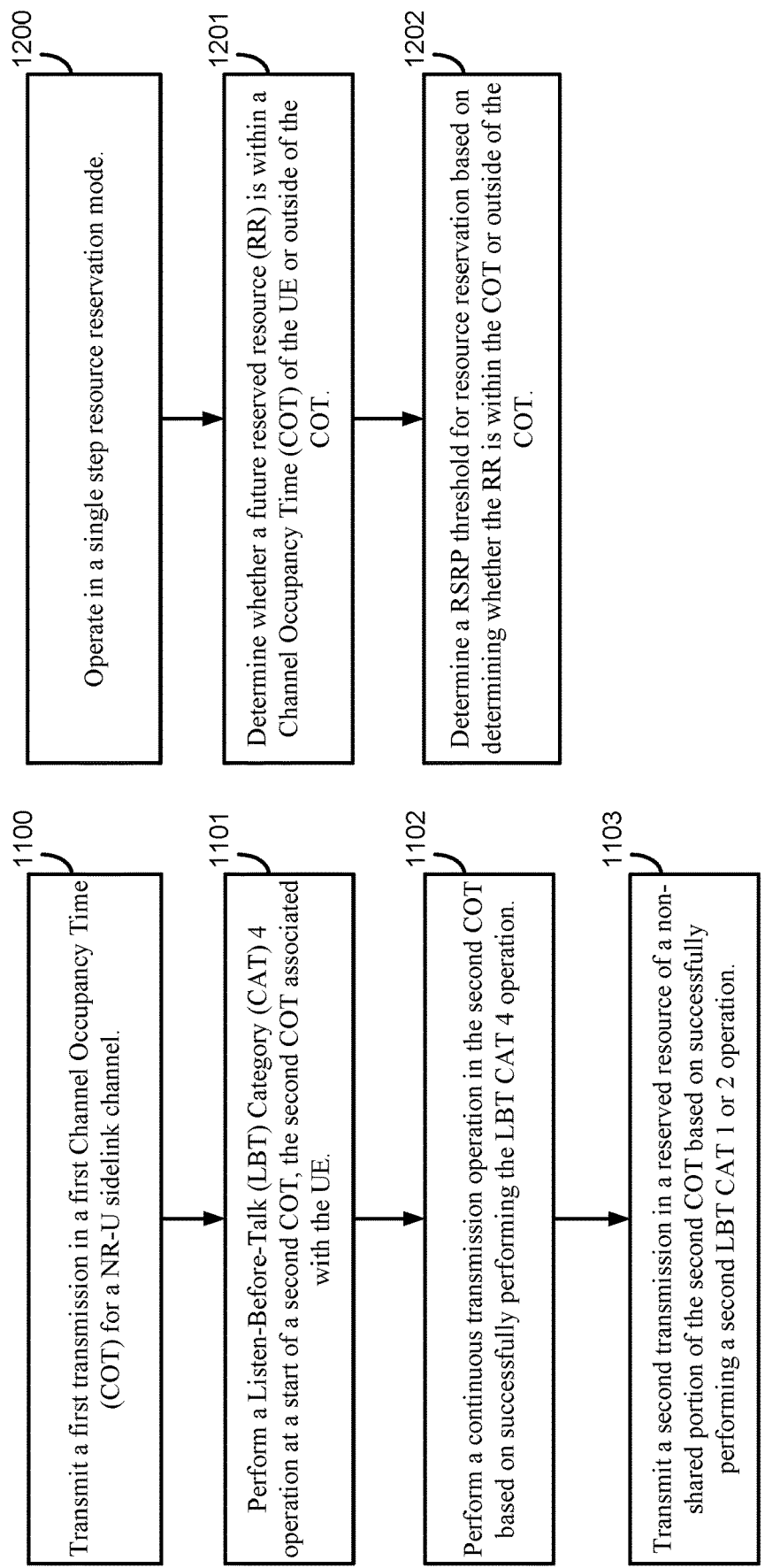
FIG. 11 is a flow diagram illustrating example blocks executed by a UE configured according to an aspect of the present disclosure.
FIG. 12 is a flow diagram illustrating example blocks executed by a UE configured according to another aspect of the present disclosure.
Figure 13:
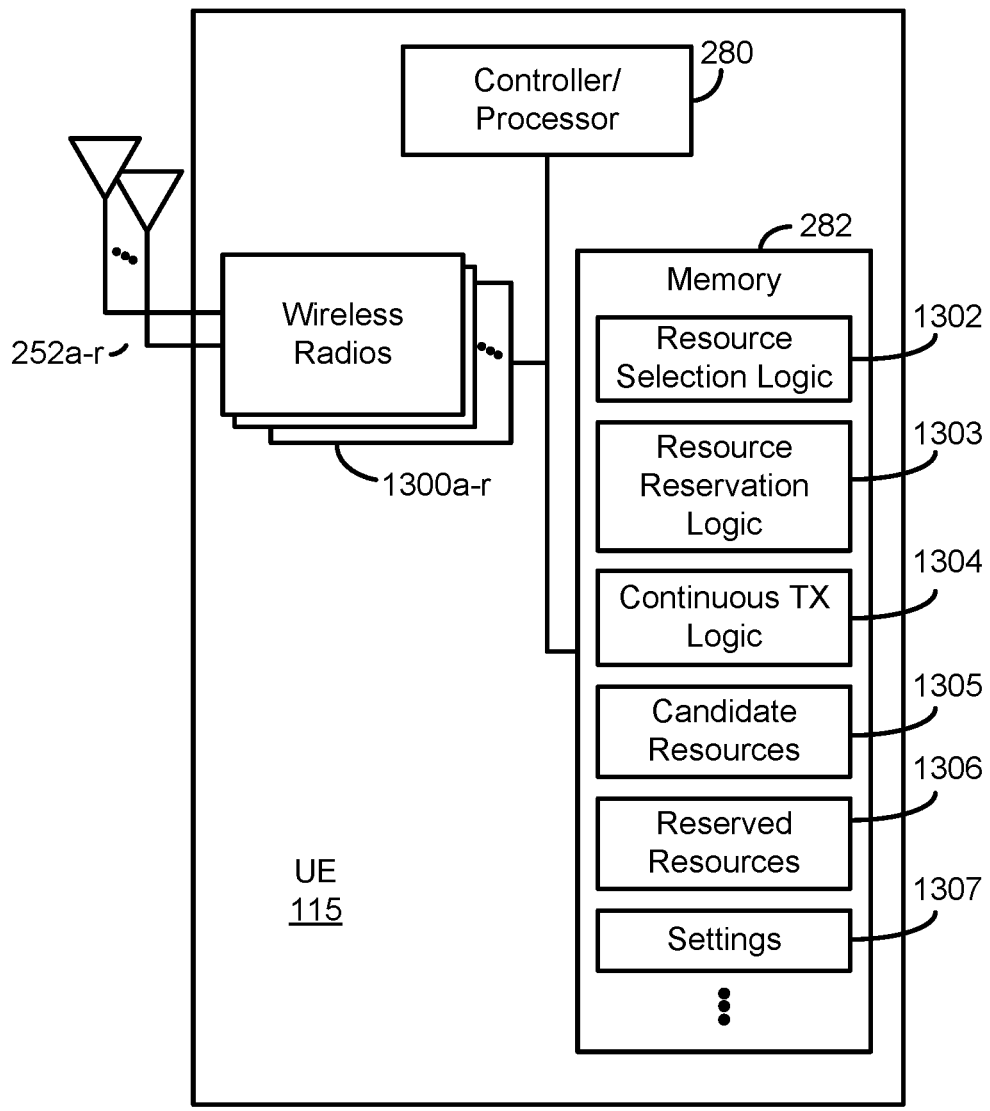
FIG. 13 is a block diagram conceptually illustrating a design of a UE configured to perform precoding information update operations according to some embodiments of the present disclosure.

FIG. 11 is a flow diagram illustrating example blocks executed by a UE configured according to an aspect of the present disclosure. The example blocks will also be described with respect to UE 115 as illustrated in FIG. 13. FIG. 13 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1300*a-r* and antennas 252*a-r*. Wireless radios 1300*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 13, memory 282 stores Resource Selection logic 1302, Resource Reservation logic 1303, Continuous Transmission logic 1304, Candidate Resources data 1305, Reserved Resources data 1306, and settings data 1307.

At block 1100, a wireless communication device, such as a UE, transmit a first transmission in a first Channel Occupancy Time (COT) for a NR-U sidelink channel. For example, the UE 115 is operating in a sidelink communication mode and transmits a sidelink transmission, as described with reference to FIGS. 4-10. The sidelink transmission may include or correspond to a PSSCH transmission to another UE and the transmission may be sent in a COT that is reserved to the UE. Alternatively, the transmission may occur in a COT that is reserved to another UE.

Optionally, the UE 115 reserves a resource in a non-shared portion of a second COT. For example, the UE 115 reserves a candidate resource in a second COT that is reserved or allocated to the UE, as described with reference to FIGS. 4-7. The resource may be selected and/or reserved based on reserved resource settings; such settings may be RRC configured or pre-set. Alternatively, the resource may be selected based on a resource selection scheme, such as a one-step (e.g., random) selection scheme or a multi-step selection scheme (e.g., two-step scheme based on time and subchannel priority), as described with reference to FIGS. 4, 6, and 9.

At block 1101, the UE 115 performs a Listen-Before-Talk (LBT) Category (CAT) 4 operation at a start of the second COT. For example, the UE 115 performs a full LBT operation, such as a LBT CAT 4 operation, at the start of the UE's own second COT. The second COT may be reserved by and/or assigned to the UE 115.

At block 1102, the UE 115 performs a continuous transmission operation in the second COT based on successfully performing the LBT CAT 4 operation, the second COT associated with the UE. For example, the UE 115 continuously transmits data (e.g., packets) from a start of the second COT even if the resources were not reserved, as described with reference to FIGS. 4-10. The continuous transmission may occur until a RR of the UE or until shortly before the RR of the UE, such as a first RR of the second COT (e.g., RR1). In some implementations, the continuous transmission operation (e.g., continuously transmitting data) includes or leaves small gaps for channel sensing (e.g., 16 µs LBT gaps) for a second transmitter to join during the UE 115's continuous transmission (contiguous transmission), as described in FIG. 7. In some other implementations, the second transmitter may join without performing a channel sensing (e.g., LBT) operation. For example, the second transmitter may transmit in the second COT without performing a LBT operation and the continuous transmission by the UE 115 may not leave small gaps (e.g., LBT gaps) for channel sensing operations.

At block 1103, the UE 115 transmits a second transmission in a reserved resource of a non-shared portion of the second COT based on successfully performing a second LBT CAT 1 or 2 operation. For example, the UE 115 performs a reduced LBT operation, such as a LBT CAT 1 or 2 operation, as described with reference to FIGS. 4-7, during or after the continuous transmission and right before the RR of the non-shared portion of the second COT. The UE 115 may then perform the second transmission in the RR without performing another full LBT CAT operation, such as a CAT 3 or 4 LBT operation, as described with reference to FIGS. 4-10.

The UE 115 may execute additional blocks (or the UE 115 may be configured further perform additional operations) in other implementations. For example, the UE 115 may perform one or more operations described above. As another example, the UE 115 may perform one or more aspects as described below.

In a first aspect, performing the continuous transmission operation includes continuously transmitting from after the LBT CAT 4 operation to at least a start of a shared portion of the second COT based on successfully performing the LBT CAT 4 operation.

In a second aspect, alone or in combination with the first aspect, continuously transmitting further includes continuously transmitting in the shared portion of the second COT while leaving one or more LBT gaps.

In a third aspect, alone or in combination with one or more of the above aspects, the LBT gap is less than or equal to 16 µs or less than or equal 25 µs. In other aspects, the LBT gap size is set based on channel sensing operations, and is configured to enable other devices to perform reduced channel sensing operations to clear the medium and begin transmitting.

In a fourth aspect, alone or in combination with one or more of the above aspects, performing the continuous transmission operation further includes continuously transmitting in the shared portion of the second COT without leaving one or more LBT gaps.

In a fifth aspect, alone or in combination with one or more of the above aspects, the second COT includes the non-shared portion and a shared portion, wherein the shared portion occurs after the non-shared portion, and wherein the non-shared portion of the second COT is reserved by the UE.

In a sixth aspect, alone or in combination with one or more of the above aspects, the UE 115 further reserves a resource in the non-shared portion of the second COT to claim the reserved resource, and the second transmission corresponds to a retransmission of the first transmission or a new transmissions of a new transmission block (TB).

In a seventh aspect, alone or in combination with one or more of the above aspects, reserving the resource includes: determining available resources of a resource selection window (RSW) which occurs before a next reserved resource (RR) for the UE; selecting a first set of available resources from the available resources based on an earliest time; and selecting a particular resource of the first set of available resources based on a highest priority sub channel for the second transmission.

In an eighth aspect, alone or in combination with one or more of the above aspects, determining the available resources includes: determining, a RSRP for each resource of the RSW; and comparing each RSRP for each resource to a RSRP threshold, wherein the available resources correspond to resources where the RSRP is less than or equal to the RSRP threshold.

In a ninth aspect, alone or in combination with one or more of the above aspects, determining the available resources further includes: determining one or more unavailable resources of the RSW based on the RSRP being greater than the RSRP threshold.

In a tenth aspect, alone or in combination with one or more of the above aspects, reserving the resource includes: determining, by the UE, available resources of a resource selection window (RSW) which occurs before a next reserved resource (RR) for the UE; assigning, by the UE, a priority to each available resource based on an earliest time and based on a highest priority subchannel for the RSW; and selecting, by the UE, a particular resource based on an assigned priority, wherein earlier times and particular subchannels are associated with higher priority.

In an eleventh aspect, alone or in combination with one or more of the above aspects, reserving the resource includes: determining available resources of a resource selection window (RSW) which occurs before a next reserved resource (RR) for the UE; assigning a priority to each available resource based on an earliest time and based on a highest priority subchannel for the RSW; and selecting a particular available resource based on an earliest time with time-division multiplexing on a first priority subchannel available.

In a twelfth aspect, alone or in combination with one or more of the above aspects, reserving the resource includes: determining available resources of a resource selection window (RSW) which occur before a next reserved resource (RR) for the UE; assigning a priority to each available resource of a first priority subchannel based on earliest time; and assigning a priority to available resources of a second priority subchannel based on earliest time.

In a thirteenth aspect, alone or in combination with one or more of the above aspects, a second apparatus transmits before a second reserved resource (RR) of the apparatus in a shared portion of the second COT.

In a fourteenth aspect, alone or in combination with one or more of the above aspects, the UE 115 further: reserves a second resource in a shared portion of the second COT; and wherein the continuous transmission operation includes to continuously transmit for one or more second slots of the second COT before the second reserved resource based on successfully performing the LBT CAT 4 operation; and transmits a third transmission in the second reserved resource.

In a fifteenth aspect, alone or in combination with one or more of the above aspects, the UE 115 further: reduces a shared portion of the second COT; and increases the non-shared portion of the second COT to generate an enlarged non-shared portion of the second COT, wherein a reserved resource (RR) of the UE is scheduled in the enlarged non-shared portion of the second COT.

In a sixteenth aspect, alone or in combination with one or more of the above aspects, the UE 115 further reserves a particular subchannel of the second COT, and wherein to perform the continuous transmission operation includes to transmit a continuous transmission in the particular subchannel of the second COT.

In a seventeenth aspect, alone or in combination with one or more of the above aspects, the reserved particular subchannel is excluded from other UE resource selection or reservation in the non-shared portion, the shared portion, or both, of the second COT, wherein the apparatus prioritizes the reserved particular subchannel for resource reservation, and wherein the apparatus prioritizes earlier time slots within the reserved particular subchannel.

In an eighteenth aspect, alone or in combination with one or more of the above aspects, performing the continuous transmission operation includes to continuously transmit packets before a reserved resource (RR) in the shared portion of the second COT.

In a nineteenth aspect, alone or in combination with one or more of the above aspects, the UE 115 is excluded from resource selection or reservation in the reserved particular subchannel in the non-shared portion, the shared portion, or both, of the second COT.

In a twentieth aspect, alone or in combination with one or more of the above aspects, performing the continuous transmission operation includes leaving a LBT gap for each slot in the reserved particular subchannel for other apparatuses to clear before transmitting in other sub channel s.

In a twenty-first aspect, alone or in combination with one or more of the above aspects, the UE 115 further: determines, prior to transmitting the second transmission, that a future reserved resource (RR) of the apparatus is scheduled in a shared portion of the second COT, which is assigned to the apparatus; and moves the future RR of the apparatus to the non-shared portion of the second COT, the future RR corresponding to the second transmission.

In a twenty-second aspect, alone or in combination with one or more of the above aspects, the UE 115 further: determines that a second future RR of the apparatus is scheduled in the shared portion of the second COT; and moves the second future RR of the apparatus to the non-shared portion of the second COT.

In a twenty-third aspect, alone or in combination with one or more of the above aspects, the second LBT CAT 1 or 2 operation is performed before the future RR based on determining a second transmission block (TB) is ready to be transmitted in a second HARQ process different from a first HARQ process of the first COT, and the UE 115 further: transmits a third transmission for the second TB at a first time in a first subchannel of the non-shared portion of the second COT, wherein the future RR is scheduled at the first time in a second subchannel of the non-shared portion of the second COT, wherein the second future RR is scheduled at a second time in the first subchannel of the non-shared portion of the second COT, and wherein the third transmission is frequency division multiplexed with the second transmission of the future RR.

In a twenty-fourth aspect, alone or in combination with one or more of the above aspects, the UE 115 further: determines whether a reserved resource (RR) for the second transmission is within the second COT or outside of the second COT; and determines a RSRP threshold for resource selection based on determining whether the RR is within the second COT or outside of the second COT.

In a twenty-fifth aspect, alone or in combination with one or more of the above aspects, the RR is outside of the second COT, and determining the RSRP threshold for resource selection includes: reducing a value of the RSRP threshold by a priority offset value; or selecting a second RSRP threshold that is less than a first RSRP threshold for RRs inside of the second COT.

In a twenty-sixth aspect, alone or in combination with one or more of the above aspects, the UE 115 further: receives a SCI transmission from another UE requesting to schedule a reserved resource (RR) for the other UE in a non-shared portion of a second COT allocated to the UE, wherein the SCI transmission indicates offset information and subchannel information for the RR; determines to block the request; determines to schedule the RR for the other UE in a shared portion of the second COT; and transmits a message to the other UE indicating that the RR for the other UE has been moved to the shared portion of the second COT.

In a twenty-seventh aspect, alone or in combination with one or more of the above aspects, the message is a SCI-1, wherein the SCI-1 indicates a slot offset and subchannel for the RR for the other UE, and wherein the SCI-1 is associated with a single HARQ ID.

In a twenty-eighth aspect, alone or in combination with one or more of the above aspects, the UE 115 further: transmits a plurality of SCI-1 transmissions, including the SCI-1, wherein multiple sets of RRs are associated with multiple HARQ IDs.

In a twenty-ninth aspect, alone or in combination with one or more of the above aspects, the UE 115 further: determines that a second reserved resource (RR) for the UE has blocked a RR for a second UE in a non-shared portion of the second COT; determines to schedule the RR for the second UE to a shared portion of the second COT based on determining that the second RR for the UE has blocked the RR for the second UE in the non-shared portion of the second COT; and transmits a sidelink channel information (SCI) transmission to the second UE to schedule the RR for the second UE, wherein the second UE uses single step resource selection.

In a thirtieth aspect, alone or in combination with one or more of the above aspects, the SCI transmission corresponds to a SCI-2 transmission, wherein the SCI-2 transmission indicates information for the relocation of the RR for the second UE, and wherein the SCI-2 transmission includes source ID information which indicates a transmitting UE ID for the RR (reservation), destination ID information which indicates a receiving UE ID for the RR, HARQ ID information which indicates the RR associated with specific HARQ ID has been relocated, or a combination thereof.

Accordingly, a UE and a base station may perform enhanced resource reservation operations. By performing enhanced resource reservation operations, throughput and reliability may be increased and such operations may enable increased spectrum sharing for sidelink operations with reduced capability (e.g., less advanced) devices.

FIG. 12 is a flow diagram illustrating example blocks executed by a UE configured according to another aspect of the present disclosure. The example blocks will also be described with respect to UE 115 as illustrated in FIG. 13.

At block 1200, a wireless communication device, such as a UE, operates in a single step resource reservation mode. For example, the UE 115 is configured to operate in a random resource reservation or selection mode, as described with reference to FIG. 6.

At block 1201, the UE 115 determines whether a future reserved resource (RR) is within a Channel Occupancy Time (COT) of the UE or outside of the COT. For example, the UE 115 determines whether an upcoming RR falls within a COT of the UE or outside a COT of the UE, as described with reference to FIGS. 4-10. To illustrate, the UE 115 determines if the RR is in a COT allocated to the UE and/or in shared portion of a COT which belongs to another UE.

At block 1202, the UE 115 determines a RSRP threshold for resource reservation based on determining whether the RR is within the COT or outside of the COT. For example, the UE 115 determines to use an alternative RSRP threshold for candidate resource determination, as described with reference to FIGS. 4, 6, and 9. To illustrate, the UE 115 may determine to use a higher RSRP threshold for Out-of-COT RRs, a lower RSRP threshold for in-COT RRs, or both. Thus, the UE 115 may have different resources available to it than other UEs might to priority the UE or the other UE.

The UE 115 may execute additional blocks (or the UE 115 may be configured further perform additional operations) in other implementations. For example, the UE 115 may perform one or more operations or aspects described above or as described with reference to FIG. 11.

Accordingly, a UE and a base station may perform enhanced resource reservation operations. By performing enhanced resource reservation operations, throughput and reliability may be increased and such operations may enable increased spectrum sharing for sidelink operations with reduced capability (e.g., less advanced) devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 11 and 12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
    transmitting, by a user equipment (UE), a first sidelink transmission in a first Channel Occupancy Time (COT) for a Fifth Generation New Radio-Unlicensed (5G NR-U) sidelink channel;
    performing, by the UE, a Listen-Before-Talk (LBT) Category (CAT) 4 operation in a second COT at a start of the second COT, wherein the second COT is associated with the UE and with the 5G NR-U sidelink channel, and wherein the second COT includes a non-shared portion and includes a shared portion which occurs after the non-shared portion of the second COT; and
    performing, by the UE, a continuous transmission operation in the second COT based on successfully performing the LBT CAT 4 operation, wherein performing the continuous transmission operation includes transmitting padding data for one or more slots of the shared portion of the second COT before a reserved resource of the second COT; and
    transmitting, by the UE, a second sidelink transmission in the reserved resource of the non-shared portion of the second COT based on successfully performing a second LBT CAT 1 or 2 operation during the second COT and associated with the reserved resource, wherein the reserved resource is reserved by the UE, wherein performing the continuous transmission operation controls the 5G NR-U sidelink channel for the UE and enables performance of the second LBT CAT 1 or 2 operation, and wherein the LBT CAT 4 operation and the second LBT CAT 1 or 2 operation are performed on the 5G NR-U sidelink channel.

2. The method of claim 1, wherein the second COT occurs after the first COT, and wherein the non-shared portion of the second COT is reserved by the UE.

3. The method of claim 1, further comprising:
    reserving, by the UE, a resource in the non-shared portion of the second COT to claim the reserved resource, wherein the second sidelink transmission corresponds to a retransmission of the first sidelink transmission or a new transmissions of a new transmission block (TB).

4. The method of claim 3, wherein reserving the resource includes:

determining, by the UE, available resources of a resource selection window (RSW) which occurs before a next reserved resource (RR) for the UE;

selecting, by the UE, a first set of available resources from the available resources based on an earliest time; and selecting, by the UE, a particular resource of the first set of available resources based on a highest priority subchannel for the second sidelink transmission.

5. The method of claim 4, wherein determining the available resources includes:

determining, by the UE, a reference signal received power (RSRP) for each resource of the RSW; and comparing, by the UE, each RSRP for each resource to a RSRP threshold, wherein the available resources correspond to resources where the RSRP is less than or equal to the RSRP threshold.

6. The method of claim 5, wherein determining the available resources further includes:

determining, by the UE, one or more unavailable resources of the RSW based on the RSRP being greater than the RSRP threshold.

7. The method of claim 3, wherein reserving the resource includes:

determining, by the UE, available resources of a resource selection window (RSW) which occurs before a next reserved resource (RR) for the UE;

assigning, by the UE, a priority to each available resource based on an earliest time and based on a highest priority subchannel for the RSW; and selecting, by the UE, a particular resource based on an assigned priority, wherein earlier times and particular subchannels are associated with higher priority.

8. The method of claim 3, wherein reserving the resource includes:

determining, by the UE, available resources of a resource selection window (RSW) which occurs before a next reserved resource (RR) for the UE;

assigning, by the UE, a priority to each available resource based on an earliest time and based on a highest priority subchannel for the RSW; and selecting, by the UE, a particular available resource based on an earliest time with time-division multiplexing on a first priority subchannel available.

9. The method of claim 3, wherein reserving the resource includes:

determining, by the UE, available resources of a resource selection window (RSW) which occur before a next reserved resource (RR) for the UE;

assigning, by the UE, a priority to each available resource of a first priority subchannel based on earliest time; and assigning, by the UE, a priority to available resources of a second priority subchannel based on earliest time.

10. An apparatus configured for wireless communication, comprising:

at least one processor; and a memory coupled to the at least one processor, wherein the at least one processor is configured to:

transmit a first sidelink transmission in a first Channel Occupancy Time (COT) for a Fifth Generation New Radio-Unlicensed (5G NR-U) sidelink channel;

perform a Listen-Before-Talk (LBT) Category (CAT) 4 operation in a second COT at a start of the second COT, wherein the second COT is associated with the apparatus and with the 5G NR-U sidelink channel, and wherein the second COT includes a non-shared portion and includes a shared portion which occurs after the non-shared portion of the second COT;

perform a continuous transmission operation in the second COT based on successfully performing the LBT CAT 4 operation, wherein performing the continuous transmission operation includes transmitting padding data for one or more slots of the shared portion of the second COT before a reserved resource of the second COT; and transmit a second sidelink transmission in the reserved resource of the non-shared portion of the second COT based on successfully performing a second LBT CAT 1 or 2 operation during the second COT and associated with the reserved resource, wherein the reserved resource is reserved by the apparatus, wherein performance of the continuous transmission operation controls the 5G NR-U sidelink channel for the apparatus and enables performance of the second LBT CAT 1 or 2 operation, and wherein the LBT CAT 4 operation and the second LBT CAT 1 or 2 operation are performed on the 5G NR-U sidelink channel.

11. The apparatus of claim 10, wherein performing the continuous transmission operation includes continuously transmitting from after the LBT CAT 4 operation to at least a start of the shared portion of the second COT based on successfully performing the LBT CAT 4 operation, and wherein a second apparatus transmits before a second reserved resource (RR) of the apparatus in the shared portion of the second COT.

12. The apparatus of claim 10, wherein the processor is further configured to:

reserve a second resource in the shared portion of the second COT; and wherein the continuous transmission operation includes to continuously transmit for one or more second slots of the second COT before the second reserved resource based on successfully performing the LBT CAT 4 operation; and transmit a third transmission in the second reserved resource.

13. The apparatus of claim 10, wherein the processor is further configured to:

reduce the shared portion of the second COT; and increase the non-shared portion of the second COT to generate an enlarged non-shared portion of the second COT, wherein the reserved resource (RR) of the apparatus is scheduled in the enlarged non-shared portion of the second COT.

14. The apparatus of claim 10, wherein the processor is further configured to:

reserve a particular subchannel of the second COT, and wherein to perform the continuous transmission operation includes to transmit a continuous transmission in the particular subchannel of the second COT.

15. The apparatus of claim 14, wherein the apparatus corresponds to a user equipment (UE), wherein the reserved particular subchannel is excluded from other UE resource selection or reservation in the non-shared portion, the shared portion, or both, of the second COT, wherein the apparatus prioritizes the reserved particular subchannel for resource reservation, and wherein the apparatus prioritizes earlier time slots within the reserved particular subchannel.

16. The apparatus of claim 14, wherein to perform the continuous transmission operation includes to continuously transmit packets before the reserved resource (RR) in the shared portion of the second COT.

17. The apparatus of claim 14, wherein to perform the continuous transmission operation includes continuously transmitting in the shared portion of the second COT while leaving a LBT gap for each slot in the reserved particular subchannel for other apparatuses to clear before transmitting in other subchannels.

18. The apparatus of claim 14, wherein to perform the continuous transmission operation includes continuously transmitting in the shared portion of the second COT without leaving one or more LBT gaps.

19. An apparatus configured for wireless communication, comprising:
    means for transmitting a first sidelink transmission in a first Channel Occupancy Time (COT) for a Fifth Generation New Radio-Unlicensed (5G NR-U) sidelink channel;
    means for performing a Listen-Before-Talk (LBT) Category (CAT) 4 operation in a second COT at a start of the second COT, wherein the second COT is associated with the apparatus and with the 5G NR-U sidelink channel, and wherein the second COT includes a non-shared portion and includes a shared portion which occurs after the non-shared portion of the second COT;
    means for performing a continuous transmission operation in the second COT based on successfully performing the LBT CAT 4 operation, wherein performing the continuous transmission operation includes transmitting padding data for one or more slots of the shared portion of the second COT before a reserved resource of the second COT; and
    means for transmitting a second sidelink transmission in the reserved resource of the non-shared portion of the second COT based on successfully performing a second LBT CAT 1 or 2 operation during the second COT and associated with the reserved resource, wherein the reserved resource is reserved by the apparatus, wherein performance of the continuous transmission operation controls the 5G NR-U sidelink channel for the apparatus and enables performance of the second LBT CAT 1 or 2 operation, and wherein the LBT CAT 4 operation and the second LBT CAT 1 or 2 operation are performed on the 5G NR-U sidelink channel.

20. The apparatus of claim 19, further comprising:
    means for determining, prior to transmitting the second sidelink transmission, that a future reserved resource (RR) of the apparatus is scheduled in the shared portion of the second COT, which is assigned to the apparatus; and
    means for moving the future RR of the apparatus to the non-shared portion of the second COT, the future RR corresponding to the second sidelink transmission.

21. The apparatus of claim 20, further comprising:
    means for determining that a second future RR of the apparatus is scheduled in the shared portion of the second COT; and
    means for moving the second future RR of the apparatus to the non-shared portion of the second COT.

22. The apparatus of claim 20, wherein the second LBT CAT 1 or 2 operation is performed before the future RR based on determining a second transmission block (TB) is ready to be transmitted in a second Hybrid automatic repeat request (HARQ) process different from a first HARQ process of the first COT, and further comprising:
    means for transmitting a third transmission for the second TB at a first time in a first subchannel of the non-shared portion of the second COT, wherein the future RR is scheduled at the first time in a second subchannel of the non-shared portion of the second COT, wherein the second future RR is scheduled at a second time in the first subchannel of the non-shared portion of the second COT, and wherein the third transmission is frequency division multiplexed with the second sidelink transmission of the future RR.

23. The apparatus of claim 19, further comprising:
    means for determining whether a second reserved resource (RR) for a third sidelink transmission is within the second COT or outside of the second COT; and
    means for determining a reference signal received power (RSRP) threshold for resource selection based on determining whether the second RR is within the second COT or outside of the second COT.

24. The apparatus of claim 23, wherein the second RR is outside of the second COT, and wherein the means for determining the RSRP threshold for resource selection includes:
    means for reducing a value of the RSRP threshold by a priority offset value; or
    means for selecting a second RSRP threshold that is less than a first RSRP threshold for RRs inside of the second COT.

25. A non-transitory, computer-readable medium storing instructions that, when executed by a processor, cause the processor to perform operations comprising:
    transmitting, by a user equipment (UE), a first sidelink transmission in a first Channel Occupancy Time (COT) for a Fifth Generation New Radio-Unlicensed (5G NR-U) sidelink channel;
    performing, by the UE, a Listen-Before-Talk (LBT) Category (CAT) 4 operation in a second COT at a start of the second COT, wherein the second COT is associated with the UE and with the 5G NR-U sidelink channel, and wherein the second COT includes a non-shared portion and includes a shared portion which occurs after the non-shared portion of the second COT;
    performing, by the UE, a continuous transmission operation in the second COT based on successfully performing the LBT CAT 4 operation, wherein performing the continuous transmission operation includes transmitting padding data for one or more slots of the shared portion of the second COT before a reserved resource of the second COT; and
    transmitting a second sidelink transmission in the reserved resource of the non-shared portion of the second COT based on successfully performing a second LBT CAT 1 or 2 operation during the second COT and associated with the reserved resource, wherein the reserved resource is reserved by the UE, wherein performing the continuous transmission operation controls the 5G NR-U sidelink channel for the UE and enables performance of the second LBT CAT 1 or 2 operation, and wherein the LBT CAT 4 operation and the second LBT CAT 1 or 2 operation are performed on the 5G NR-U sidelink channel.

26. The non-transitory, computer-readable medium of claim 25, wherein the instructions further cause the processor perform operations comprising:
    receiving, by the UE, a sidelink channel information (SCI) transmission from another UE requesting to schedule a reserved resource (RR) for the other UE in the non-shared portion of the second COT allocated to the UE, wherein the SCI transmission indicates offset information and subchannel information for the RR for the other UE;
    determining, by the UE, to block the request;
    determining, by the UE, to schedule the RR for the other UE in the shared portion of the second COT; and transmitting, by the UE, a message to the other UE indicating that the RR for the other UE has been moved to the shared portion of the second COT.

27. The non-transitory, computer-readable medium of claim 26, wherein the message is a SCI-1, wherein the SCI-1 indicates a slot offset and subchannel for the RR for the other UE, and wherein the SCI-1 is associated with a single Hybrid automatic repeat request (HARQ) ID.

28. The non-transitory, computer-readable medium of claim 27, wherein the instructions further cause the processor perform operations comprising:
transmitting, by the UE, a plurality of SCI-1 transmissions, including the SCI-1, wherein multiple sets of RRs are associated with multiple HARQ IDs.

29. The non-transitory, computer-readable medium of claim 25, wherein the instructions further cause the processor perform operations comprising:
determining, by the UE, that a second reserved resource (RR) for the UE has blocked a third RR for a second UE in the non-shared portion of the second COT;
determining, by the UE, to schedule the third RR for the second UE to the shared portion of the second COT based on determining that the second RR for the UE has blocked the third RR for the second UE in the non-shared portion of the second COT; and
transmitting, by the UE, a sidelink channel information (SCI) transmission to the second UE to schedule the third RR for the second UE, wherein the second UE uses single step resource selection.

30. The non-transitory, computer-readable medium of claim 29, wherein the SCI transmission corresponds to a SCI-2 transmission, wherein the SCI-2 transmission indicates information for relocation of the third RR for the second UE, and wherein the SCI-2 transmission includes source ID information which indicates a transmitting UE ID for the third RR, destination ID information which indicates a receiving UE ID for the third RR, Hybrid automatic repeat request (HARQ) ID information which indicates the third RR associated with specific HARQ ID has been relocated, or a combination thereof.

* * * * *